(12) United States Patent
Maxwell et al.

(10) Patent No.: US 7,350,361 B2
(45) Date of Patent: Apr. 1, 2008

(54) SELF-HEATING OR COOLING CONTAINER

(75) Inventors: Ian Robert Maxwell, Berkshire (GB); Paul Robert Dunwoody, Oxfordshire (GB); Christopher Paul Ramsey, Oxfordshire (GB)

(73) Assignee: Crown Packaging Technology, Inc.

( * ) Notice: Subject to any disclaimer, the term of this patent is extended or adjusted under 35 U.S.C. 154(b) by 421 days.

(21) Appl. No.: 10/514,684

(22) PCT Filed: May 13, 2003

(86) PCT No.: PCT/EP03/04981

§ 371 (c)(1),
(2), (4) Date: Mar. 16, 2005

(87) PCT Pub. No.: WO03/096855

PCT Pub. Date: Nov. 27, 2003

(65) Prior Publication Data

US 2005/0155599 A1     Jul. 21, 2005

(30) Foreign Application Priority Data

May 17, 2002  (EP)  .................................. 02253508

(51) Int. Cl.
*F25D 5/00*  (2006.01)
*B65B 63/08*  (2006.01)
*F24J 1/00*  (2006.01)

(52) U.S. Cl. ............................. 62/4; 62/60; 126/263.06
(58) Field of Classification Search ...................... 62/4, 62/60; 126/263.01, 263.08, 263.09, 263.06
See application file for complete search history.

(56) References Cited

U.S. PATENT DOCUMENTS

| | | | | |
|---|---|---|---|---|
| 1,833,105 A * | 11/1931 | Aronson | ........................ | 601/15 |
| 4,773,389 A   | 9/1988  | Hamasaki | ..................... | 126/263 |
| 4,784,678 A * | 11/1988 | Rudick et al. | ..................... | 62/4 |
| 5,257,755 A * | 11/1993 | Moser et al. | ............... | 244/3.16 |
| 5,313,799 A * | 5/1994  | Siegel | ............... | 62/4 |
| 5,984,953 A   | 11/1999 | Sabin et al. | ................. | 607/114 |
| 6,103,280 A * | 8/2000  | Molzahn et al. | ............. | 426/109 |
| 6,178,753 B1* | 1/2001  | Scudder et al. | ................... | 62/4 |
| 2001/0029741 A1* | 10/2001 | Peters et al. | ...................... | 62/4 |

* cited by examiner

*Primary Examiner*—William C Doerrler
(74) *Attorney, Agent, or Firm*—Woodcock Washburn LLP

(57) ABSTRACT

This invention relates to a self-heating or self-cooling container (1), which uses an exothermic or endothermic reaction to provide or remove heat from the contents of the container. The chemical reaction includes a fluid consistuent (either as a reagent or solvent), held in a reservoir (6), which is added to another reagent in the reaction chamber (5) to initiate the reaction. The container (1) according to the invention proposes a means (8, 91) to control the volume of this fluid constituent added to the reaction chamber (5) depending on the ambient temperature of the container.

10 Claims, 2 Drawing Sheets

SELF-HEATING OR COOLING CONTAINER

The present invention relates to self-heating and self-cooling containers, which rely on an exothermic or endothermic chemical reaction respectively, to effect heating or cooling of a product held therein. In particular the invention proposes an arrangement to control the degree of heating or cooling produced by the chemical reaction in response to the ambient temperature of the container.

When the ambient temperature is higher a self-heating can will be required to produce less heat to raise the temperature of the product in the can to a desired temperature. If the exothermic reaction is not controlled, the container may become uncomfortable or dangerous to handle.

Conversely, when the ambient temperature is higher, a self-cooling can will be required to produce a greater cooling effect. Thus, the endothermic reaction will be required to absorb more heat.

Various methods of controlling the heat produced by a self-heating pack in response to the ambient temperature have been suggested in the prior art. For example, U.S. Pat. No. 5,984,953 describes the use of a "stiffenable gel" to alter the rate of an exothermic chemical reaction, in conjunction with a vaporisable solvent which adjusts the stiffness of the gel, depending upon the ambient temperature conditions in which the "heating pack" is used.

The present invention requires the chemical reaction to include at least one fluid constituent, either as a reagent or solvent. A temperature control arrangement, which is driven by the ambient temperature of the container, acts to control the volume of this fluid constituent added to the reaction. The fluid constituent may include substances such as gels, provided they are sufficiently mobile and able to flow.

Accordingly, the present invention provides a self-heating or self-cooling container which uses an exothermic or endothermic chemical reaction to effect heating or cooling, the container comprising a body for holding a product, a reaction chamber, for holding a primary fuel, a reservoir for holding a fluid constituent, and an activation means for creating a fluid flow path from the reservoir into the reaction chamber, characterised in that, the container further comprises a temperature control means, which responds to the ambient temperature of the container to control the volume of the fluid constituent entering the reaction chamber.

Preferably the self-heating or self-cooling container includes a reservoir (for holding the fluid constituent), whose volume may be reduced by a user of the container. As the volume of the reservoir is reduced, the fluid constituent is forced into the reaction chamber initiating the chemical reaction.

Preferably the container has at least two parts, which are adapted to move relative to one another. A first part of the container is coupled to a wall of the reservoir and the volume reduction of the reservoir is achieved by movement of this first part of the container relative to the other (second) part. The movement may be achieved by a user simply by pressing on the first part of the container. However, preferably the first and second parts of the container are coupled by a co-operating screw thread arrangement. A user of the container simply rotates first part of the container relative to the other part, to cause axial movement of a wall of the reservoir, resulting in a volume reduction thereof. Such an arrangement allows controlled addition of the fluid constituent to the reaction chamber because the rate of volume change of the reservoir and hence the rate of addition on the fluid constituent, is controlled somewhat by the pitch of the screw thread.

Advantageously, the fluid connection between the reservoir and the reaction chamber is provided by a conduit having a normally closed valve therein. The fluid constituent is normally prevented from entering the reaction chamber by the valve, particularly during storage or transport of the container. However, upon activation of the reaction by a user, the valve opens to allow the fluid constituent to enter the reaction chamber, thereby initiating the chemical reaction.

Advantageously, the fluid constituent in the reservoir is pressurised upon activation of the container by a user and the increase in pressure opens the valve and thereby the conduit between the reservoir and the reaction chamber. Thereafter, the valve is preferably adapted to close itself, once the pressure in the reservoir is relieved. Thus, a self-closing valve (well known to those skilled in the art) may be incorporated into the conduit for this purpose.

Alternatively, the conduit may be normally blocked by a membrane or a "break-out" (connected to the conduit by a weakened section) which has to be pierced before the fluid constituent can enter the reaction chamber.

In a first embodiment, the temperature control means takes the form of a "stop", whose position is determined by the ambient temperature, thereby controlling the volume of fluid constituent that can be forced into the reaction chamber. The "stop" comprises a physical stop member, which is designed to resist further activation of the container. The position of the physical stop member is controlled by a temperature sensitive material. Advantageously, the temperature sensitive material changes its volume depending upon the ambient temperature of its surroundings. Thus, if the material is constrained within a tube of constant cross section, for example, the physical stop member may be supported by the material and its axial position within the reservoir controlled. The temperature sensitive material may be chosen such that it expands or contracts significantly in response to a change in the ambient temperature of the surroundings. Suitable materials include certain waxes or greases, which expand in response to increased temperature, or materials such as Hydrogels, which expand in response to a decrease in temperature. Hydrogels are particularly preferred because their volume changes linearly with temperature.

Taking the example of a self-heating can: At increased ambient temperatures, the exothermic reaction is required to produce less heat. Therefore, the exothermic reaction needs to be stopped before all the reagents have been used up. According to the invention, this is achieved by preventing full volume reduction of the fluid reservoir, thereby halting the addition of fluid reagent to the reaction chamber. Therefore, when the ambient temperature is higher, the stop arrangement needs to be designed such that the physical stop member prevents further actuation of the can by the user.

Where a wax or grease, which expands in response to increased temperature, is chosen as the temperature sensitive material, the physical stop member needs to be coupled to the moving wall of the reservoir in order to stop movement of the wall earlier than could be achieved at lower temperatures. If a Hydrogel, which expands in response to decreased temperature, is chosen as the temperature sensitive material, the physical stop member needs to be coupled to the stationary part of the reservoir, to allow the greatest degree of movement of the moving wall of the reservoir, when the temperature is lowest and the least amount of movement when the temperature is higher.

The "stop" may take the form of a mechanical arrangement, which is designed to amplify the expansion of chosen materials (metal, for example) caused by the change in ambient temperature. Preferably, the "stop" is made from a material which itself undergoes significant expansion or contraction in response to the normal variation expected in the ambient temperature (i.e. 0° -40° C.). Such materials will be well known to those skilled in the art. The "stop" must both expand/contract significantly and also act as an effective stop i.e. it must also be able to resist further activation of the can by the user.

In a second embodiment of the invention, the self-heating or self-cooling container also comprises an auxiliary reservoir, into which any fluid constituent, not required in the reaction is directed. In the case of a self-heating can, one or more conduits are provided to this auxiliary reservoir. The or each auxiliary conduit may be blocked by a plug, which melts in response to an increase in the ambient temperature. Preferably a plurality of conduits are provided, each blocked by a plug, which melts at a different temperature. Suitable chemicals for the plugs are taken from the family of paraffin waxes, which have discrete melting points. For example, Hexadecane [melting point 18° C.], Palmitate (e.g Propylpalmitate [melting point 20° C.]) and Myristate (e.g Benzyl Myristate [melting point 21° C.]). Thus, as the ambient temperature increases one or more plugs melt, opening the associated auxiliary conduit. On actuation of the container by a user, a proportion of the fluid constituent is forced into the reaction chamber but a proportion is also forced into the auxiliary reservoir, where it takes no part in the chemical reaction.

In this embodiment, one or more conduits may be provided between the reservoir and the auxiliary reservoir with a valve located therein which progressively opens in response to an increase in the ambient temperature of the container. However, preferably a plurality of conduits is provided to the auxiliary reservoir, each blocked by a plug, which melts at a different, predetermined temperature. As the ambient temperature increases, so does the number of plugs that melt, opening more of the conduits to the auxiliary reservoir and thereby increasing the volume of fluid directed away from the reaction chamber.

The advantage of this arrangement is the simplicity of construction. The plugs are simply small slugs of material, which melt at a defined temperature.

Preferably, the plug material and material used to define the auxiliary conduits (into which the plugs are placed) have a high surface tension with respect to each other, so that the plugs "cling" to the conduit and can only be removed by melting. A step may also be defined in the wall of the auxiliary conduit, to prevent the plug being forced out of its associated conduit by the pressure applied to the fluid constituent. Again, the conduits and plugs are designed such that the plug may only be removed from its associated conduit by melting.

Finally, the fluid constituent may be provided in the form of a gel and the reservoir arrangement may be designed such that the fluid constituent itself substantially blocks the one or more auxiliary conduits. As the ambient temperature rises, the gel becomes more mobile and a greater proportion of the gel is forced through the auxiliary conduits to the auxiliary reservoir, rather than to the reaction chamber. In this arrangement the diameter and length of the or each auxiliary conduit is critical in determining the volume of fluid constituent entering the auxiliary reservoir, compared to that entering the reaction chamber.

The present invention will now be described by way of example only with reference to the accompanying drawings in which.

Figure 1:
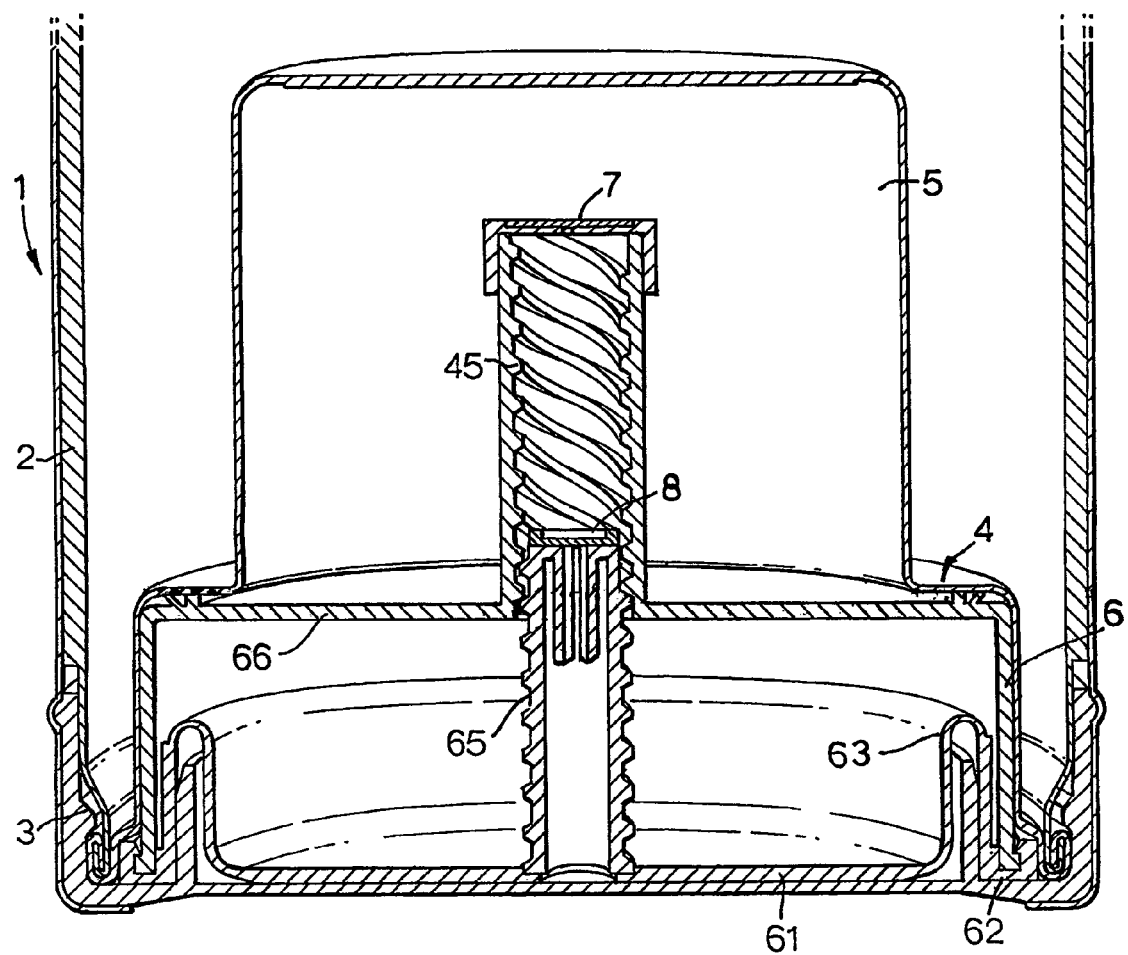
FIG. 1 shows a side, section view of a self-heating can according to a first embodiment of the invention. In this embodiment a "stop" (whose position is determined by the ambient temperature) is arranged to limit the volume reduction of the reservoir and thereby control the volume of fluid constituent driven into the reaction chamber.
Figure 2:
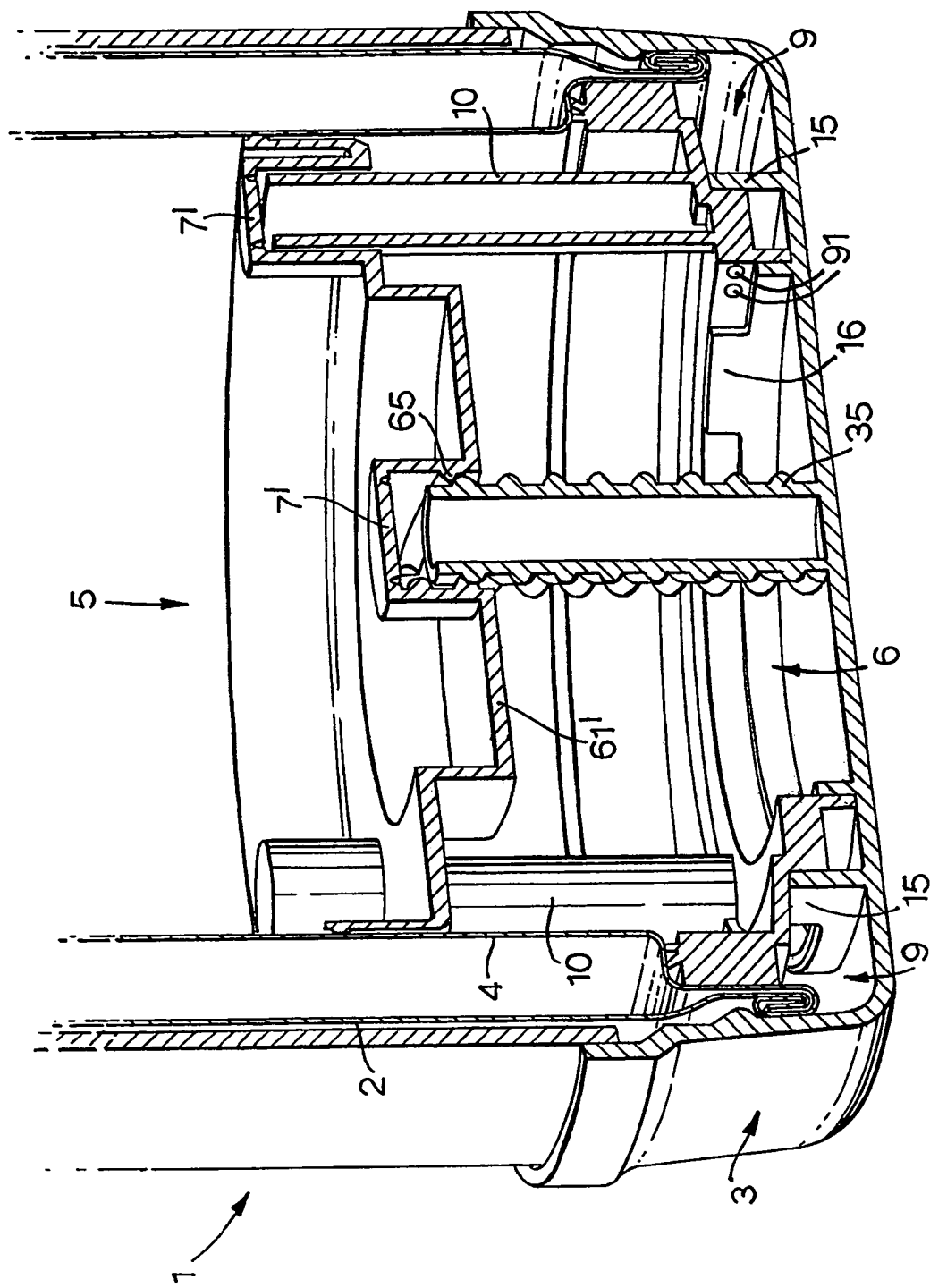
FIG. 2 shows a side, section view of a self-heating can according to a second embodiment of the invention. In this embodiment an auxiliary reservoir is provided into which a volume of the fluid constituent is diverted, depending upon the ambient temperature.

Referring to FIGS. 1 and 2, a self-heating container according to the invention comprises a can 1 having a body 2, a base 3 and an insert 4. The insert 4 defines a reaction chamber 5 for a primary fuel and a reservoir 6 for a fluid constituent. The reservoir 6 is adapted to accommodate a reduction in volume on actuation of the can 1 by a user.

Referring to FIG. 1, the floor 61 of the reservoir 6 is designed to move axially upon actuation of the can 1 by a user, thereby reducing the volume of the reservoir 6. The insert 4 is fixed relative to the body of the can 2 and the floor 61 of the reservoir is rigidly coupled to the base 3. The floor 61 of the reservoir 6 and the insert 4 have a co-operating screw thread arrangement 45, 65 to effect axial movement of the floor 61 relative to the insert 4. The periphery 62 of the floor 61 is fixed to the base 3. Adjacent to the periphery 62, a flexible diaphragm 63 is provided, to accommodate the axial movement of the floor 61, whilst the overall length of the can 1 remains fixed.

In use, the user of the can 1 twists the base 3 relative to the body 2, the floor screw thread 65 and the insert screw thread 45 interact to drive the floor 61 of the reservoir axially by the progression of the reservoir thread 65 along the insert thread 45. This axial movement is accommodated by the flexible diaphragm 63, which unfolds as the floor 61 moves. The movement of the floor 61, reduces the volume of the reservoir 6 and forces the fluid constituent (not shown) held therein along a flow path (not shown) from the reservoir to the reaction chamber through the reservoir thread 65 and insert thread 45.

A pressure-activated valve 7, which is normally closed, is provided in the flow path between the reservoir and the reaction chamber 5. The valve prevents accidental actuation of the can. However, once the user rotates the base 3 of the can 1, the volume of the reservoir 6 reduces as described above, pressurising the fluid constituent held therein, and driving it through the flow path. The valve 7 opens in response to the increased pressure and allows the fluid constituent to enter the reaction chamber 5.

In a first embodiment of the invention (shown in FIG. 1) the temperature control means comprises a "stop" 8, which expands in response to the temperature of the can 1. In "normal" conditions the stop 8 is designed to exhibit no or limited expansion and the co-operating screw threads 45, 65 progress relative to one another until the volume of the reservoir 6 is reduced to substantially 0 (i.e. when the floor 61 of the reservoir contacts the opposite boundary 66 of the reservoir 6). In this condition, the total volume of fluid constituent held in the reservoir 6 is transferred to the reaction chamber 5.

However, when the ambient temperature is higher, the "stop" expands and limits the progression of the threads 45 and 65 relative to one another. This in turn halts the axial movement of the floor 61 and thereby the volume reduction of the reservoir 6. Thus, in this condition, a certain volume of fluid constituent is retained in the reservoir 6 and only the remainder is transferred to the reaction chamber 5. Thus, the reaction is halted once the "stop" acts to limit the rotation of the base 3 relative to the body 2.

Preferably, the "stop" is provided by a wax or grease held in a piston cylinder. As the ambient temperature of the surroundings rises, the wax or grease expands, driving the piston outwardly of the cylinder. The piston acts as a mechanical stop to prevent further movement of the floor 61 of the reservoir.

In a second embodiment of the invention (as shown in FIG. 2), the can 1 also includes an auxiliary reservoir 9. The auxiliary reservoir 9 is connected to the fluid reservoir 6 by a plurality of bypass flow paths 91. A meltable wax plug (not shown) is provided in each flow path 91.

In "normal" conditions, the volume reduction of the reservoir 6 occurs as previously described. All the fluid constituent is directed to the reaction chamber, because the meltable plugs remain solid and block the bypass flow paths 91. As the ambient temperature increases, some or all of the plugs melt and the associated bypass flow paths 91 open, providing fluid communication with the auxiliary reservoir 9. In these conditions, only a portion of the fluid constituent is transferred from the reservoir 6 to the reaction chamber 5. The remaining portion is directed to the auxiliary reservoir 9, where it takes no part in the chemical reaction.

As shown in FIG. 2, the flow path or paths between the reservoir 6 and the reaction chamber 5 are normally blocked by a "break-out" 7' prior to activation of the can by a user. It will be appreciated that the valve 7 shown in FIG. 1 may be replaced by a similar "break-out" to those shown in FIG. 2 and vice versa.

In this second embodiment, the base of the can 3 is provided with a base screw thread 35, which rotates with the base 3. A moveable divider 61' separates the reaction chamber 5 from the reservoir 6 and is provided with a screw thread arrangement 65, arranged to co-operate with the base screw thread 35. The divider 61' is prevented from rotating with the base 3 by location rods 10.

In use, a user of the can 1 rotates the base 3, thereby rotating the base screw thread 35. The divider is prevented from rotating with the base 3 by the location rods 10. As the divider 61 is unable to rotate, rotation of the base 3 causes axial movement of the divider 61. The base screw thread 35 and location rods 10, break the frangible connection of the "break-outs" 7', opening the fluid communication between the reservoir 6 and the reaction chamber 5. Furthermore, as the divider 61 moves axially, the volume of the reservoir 5 is reduced, driving the fluid constituent out of the reservoir 5. In "normal" design conditions, all the fluid constituent is transferred to the reaction chamber 5. As the ambient temperature rises above the "normal" design conditions, the plugs in the auxiliary flow paths 91 progressively melt and a proportion of the fluid constituent is bypassed to the auxiliary reservoir 9 and takes no part in the chemical reaction. In this way, the chemical reaction produces less heat, which prevents overheating of the product in the can 1.

The can 1, shown in FIG. 2 also has an arrangement of plates 15, 16, which are designed to accommodate restricted rotational movement. The plates 15, 16 are used during the insertion of the plugs and also during transport of the can, when it may encounter temperature condition that are different to those in which the can will be used.

Preferable the plugs are formed by filling the auxiliary flow paths 91 with molten material, which is then allowed to set within the flow paths 91. One of the plates 15, 16 is rotated to block one end of the auxiliary flow paths 91 and the molten material is then injected into the other, open end of the flow path 91. When full, the other plate 15, 16 is rotated to cover the other end of the auxiliary flow paths 91. Thus, if the can 1 is subjected to higher temperatures during transport, the plugs may melt but will be constrained within the flow paths 91 and will re-set if the temperature reduces. Upon first activation of the can by a user, the initial rotation of the base 3 will move the plates 15, 16 away from the auxiliary flow paths 91 and, depending on the ambient temperature of the container, one or more of the plugs will have melted and be forced into the auxiliary reservoir by the fluid constituent.

It will be apparent that certain of the features of the can shown in FIG. 2 may be applied to the can shown in FIG. 1 and vice versa. Furthermore, many other methods of sealing the fluid connection between the reaction chamber and the reservoir will be apparent to those skilled in the art. For example, it is not beyond the scope of the invention to provide a flexible reservoir for the fluid constituent (such as a flexible pouch), which is pierced upon first actuation of the can by the user, to allow the fluid constituent access to the primary fuel in the reaction chamber.

Suitable exothermic and endothermic chemical reactions will also be apparent to those skilled in the art. One of the reagents may be a fluid or alternatively, the reagents may be provided in an inert solid form and the fluid constituent may take the form of a solvent, which initiates the chemical reaction by holding one or more of the reagents in solution.

The invention claimed is:

1. A self-heating or self-cooling container which uses an exothermic or endothermic chemical reaction to effect heating or cooling, the container comprising
    a body for holding a product,
    a reaction chamber for holding a primary fuel,
    a reservoir for holding a fluid constituent,
    an activation means for creating a fluid flow path from the reservoir into the reaction chamber, and
    a temperature control means which responds to the ambient temperature of the container to control the volume of the fluid constituent entering the reaction chamber
    wherein (i) the reservoir is adapted to accommodate a reduction in volume, the volume reduction pressurizing the fluid constituent and thereby creating the fluid flow path into the reaction chamber, and (ii) the temperature control means comprises a stop, whose position automatically adjusts in response to the ambient temperature of the container, the stop arranged to prevent further volume reduction of the reservoir and thereby to prevent further addition of the fluid constituent to the reaction chamber.

2. A self-heating or self-cooling container according to claim 1, wherein the reservoir comprises two portions, a housing portion and a plunger portion and the plunger portion is adapted to move within the housing portion to produce the volume reduction of the reservoir.

3. A self-heating or self-cooling container according to claim 2, wherein the plunger portion is provided with a screw thread arrangement which co-operates with a complimentary screw thread arrangement on the housing portion to effect movement of the plunger portion within the housing portion.

4. A self-heating or self-cooling container according to claim 2, wherein the plunger portion is anchored to the container and movement of the plunger portion is accommodated by a flexible diaphragm.

5. A self-heating or self cooling container according to claim 1, having a fluid flow path between the reservoir and the reaction chamber, wherein a valve is provided in the fluid flow path and the valve is adapted to open in response to increased pressure within the reservoir.

6. A self-heating container according to claim 1, wherein the temperature control means comprises a material, which expands significantly in response to an increase in the ambient temperature of the container.

7. A self-heating container according to claim 6, wherein the material is a wax or oil.

8. A self-heating or self-cooling container according to claim 1, wherein the temperature control means comprises a mechanical arrangement, which expands significantly in response to an increase in the ambient temperature of the surroundings.

9. A self-heating container which uses an exothermic chemical reaction to effect heating, the container comprising:
- a body for holding a product,
- a reaction chamber for holding a primary fuel,
- a reservoir for holding a fluid constituent,
- an activation means for creating a fluid flow path from the reservoir into the reaction chamber;
- a temperature control means which responds to the ambient temperature of the container to control the volume of the fluid constituent entering the reaction chamber; and
- an auxiliary reservoir connected to the reservoir, by one or more flow paths
- wherein (i) the reservoir is adapted to accommodate a reduction in volume, the volume reduction pressurizing the fluid constituent and thereby creating the fluid flow path into the reaction chamber, (ii) the temperature control means comprises a plug associated with the or each flow path, which is adapted to open when the ambient temperature of the surroundings reaches a pre-defined temperature, and (iii) the or each plug is made from a material, which melts in response to an increase in the ambient temperature of the container.

10. The self heating container of claim 9, wherein each plug melts at a different temperature.

* * * * *